3,309,422
PROCESS FOR PREPARING INTERPOLYMERS OF STYRENE AND RUBBERY DIOLEFIN POLYMERS
Kenneth W. Doak and Frederick E. Carrock, Wyckoff, N.J., assignors to Rexall Drug and Chemical Company, Los Angeles, Calif., a corporation of Delaware
No Drawing. Filed Sept. 3, 1963, Ser. No. 306,349
12 Claims. (Cl. 260—880)

This invention relates to an improved process for the preparation of interpolymers of acrylonitrile, styrene and rubber, and more specifically to a process for preparing interpolymers containing a rubber phase dispersed in a resin phase matrix. The invention is particularly concerned with the use of specific polymerization initiators. The notation interpolymers, as used throughout the specification and the appended claims, includes polymer compositions resulting from the graft polymerization of styrene and rubber (impact resistant polystyrene) and acrylonitrile, styrene and rubber (ABS polymers), the rubber component in these interpolymers being composed of one or more polymerized monomers (homo or copolymer rubbers).

A recently developed process for preparing impact resistant interpolymers comprises the steps of dissolving a rubbery polymer in a mixture of styrene and/or equivalents and acrylonitrile, prepolymerizing the resulting mixture in bulk to from about 10 to 45% conversion, and preferably from about 15 to 30% conversion, and then suspending the prepolymer reaction product mixture in an aqueous suspension and polymerizing the resulting mixture to completion to obtain the interpolymer product.

Interpolymers prepared from compounds of styrene and/or equivalents or styrene and acrylonitrile grafted onto a rubbery polymer have enhanced physical and chemical properties with respect to ambient and low temperatures, weather and heat resistance and mechanical strength and are useful, therefore, in the preparation of a variety of plastic products by well known plastic processing techniques. The interpolymer products obtained by the above described process, often referred to hereinafter as the two step bulk-suspension polymerization process or technique, has the further advantage of yielding uniform sized polymer beads of narrow size distribution.

In carrying out the two step bulk-suspension polymerization process, it would be desirable to obtain the fastest polymerization rates possible and also to be able to control the process so that important physical characteristics such as impact strength and surface hardness can be improved to comply with interpolymer product requirements.

One object of this invention is to provide an improved process for polymerizing acrylonitrile and styrene and/or its equivalents or styrene with a rubbery material to obtain outstanding interpolymer products.

A further object of this invention is to provide an improvement in the two step bulk-suspension polymerization process so as to improve the impact strength and the surface hardness of interpolymer products prepared from acrylonitrile, styrene and a rubbery material.

These and other objects of the invention will become apparent from the ensuing description.

In accordance with this invention, it has now been found that improved polymer properties can be attained by utilizing a special peroxide initiator, namely cyclohexanone peroxide, in the prepolymerization step, which will be described hereinafter in greater detail, rather than the one or more of the peroxides disclosed in the prior art interpolymer polymerization processes. Further, in accordance with this invention, it has been found that the employment of cyclohexanone peroxide as an initiator in the prepolymerization step in combination with t-butyl perbenzoate in the suspension step, yield unexpectedly superior physical property results over prior techniques of preparing interpolymers of the class herein designated. Substantial equivalents of t-butyl perbenzoate, that is, those having a half-life similar to this initiator such as tertiary butyl peracetate and dicumyl peroxide can also be used, but the preferred combination for the prepolymerization-suspension steps is cyclohexanone peroxide and t-butyl perbenzoate respectively.

The amount of cyclohexanone peroxide employed in the prepolymerization step can vary from about 0.05 to 0.3% and preferably about 0.075 to 0.25% by weight based on the total weight of the reaction mixture. Although the amount of initiator need only be such as to catalyze the polymerization, that is, an initiating amount, it has been found that certain physical properties can be readily improved by using controlled amounts of the prepolymerization initiator. The method of preparing the cyclohexanone peroxide is not critical and conventional methods such as the reaction between cyclohexanone and hydrogen peroxide may be utilized. Commercially available cyclohexanone peroxide can, of course, also be employed in the process herein.

The invention will be more fully understood by the following description of the materials employed and the operating conditions.

As the rubber phase, there can be employed, according to the process of this invention, rubbery systems, such as butadiene-acrylonitrile copolymer (nitrile rubber) containing from 10 to 30% acrylonitrile, polybutadiene rubbers, whether of the linear or non-linear type (emulsion polymerization of butadiene results in a non-linear polymer), polyisoprene, polycyclopentadiene, natural rubber, chlorinated rubber, copolymers of butadiene with styrene, both linear and non-linear, copolymers of butadiene with isobutylene and mixtures thereof. The homopolymers of isoprene can be of the linear or non-linear type. Conventional SBR type or linear (solution polymerized with stereospecific catalysts) rubbers can contain from 5 to 50% by weight of styrene to 50 to 95% by weight of butadiene, a specific type containing about 25% styrene and 75% butadiene by weight.

A preferred rubbery component, according to this invention, is a linear polybutadiene having a cis (polymerized by 1,4 addition) content of about 30 to 98%, preferably 35 to 60%. The terpolymers obtained when the preferred linear polybutadiene is used yield resins of excellent color, gloss and high impact strengths, low temperature toughness and improved heat resistance.

Butadiene (or isoprene) polymerized by stereospecific catalysts exists in a rubbery form at ambient temperatures. The linear form can be produced either by lithium metal or lithium alkyls or by a Ziegler type catalyst system, as is well known in the art. These methods of polymerization yield linear polymers in contradistinction to a largely non-linear polymer obtained by well known emulsion polymerization procedures. The preferred linear polybutadiene which can be employed in the compositions of this invention will have a Mooney viscosity between 20 to 90, preferably 35 to 60, as measured on the Mooney viscometer at 212° F. (ML-4) (ASTM D-927-55T).

In the interpolymers of this invention utilizing styrene, substantial equivalents of this monomer can be incorporated in full or in part in the polymerization system, whether the interpolymer is an ABS or impact resistant polystyrene. For example, part of the styrene can be substituted for alpha-methylstyrene, for example, up to 50% by weight, to impart certain properties to the interpolymer, such as improved heat resistance and flow properties. Vinyl aromatics other than styrene can also be used, at least in part, or substituted fully for the styrene monomer, for example, those compounds having the aromatic nucleus substituted with one or more groups, such as methyl, ethyl or chloro groups illustrated by such monomers as vinyltoluene, vinylxylene, vinylethyl benzene and vinylchloro benzene or mixtures of these, including minor amounts of alpha-methylstyrene. Methyl methacrylate can also be used in preparing the interpolymers of this invention. This monomer can be used in combination with styrene and with styrene and acrylonitrile or with these and alpha-methylstyrene. In one embodiment of this invention, acrylonitrile and styrene are the monomeric components employed, modified as desired with minor amounts of alpha-methylstyrene for the purposes indicated above. The invention will be described with reference to these components.

The styrene and acrylonitrile utilized as a feed mixture can initially be introduced to the prepolymerization reaction in a ratio of about 40/60 to 60/40 and then styrene added during the prepolymerization step and/or the suspension step in one or more increments to prepare homogeneous interpolymers having an overall ratio of styrene to acrylonitrile of 60/40 to 74/26 as more fully disclosed in copending application, Ser. No. 302,716, filed Aug. 16, 1963 and assigned to the assignee of the process herein. Although the monomer components will copolymerize under free radical initiation in various ratios to yield resinous materials, the weight ratios which are present in the azeotropic composition, i.e. the composition at which the monomer components will enter the copolymer in the same ratio in which the monomers are present in the initial polymerization mass can likewise be employed herein. For styrene-acrylonitrile copolymer, the azeotropic composition is approximately 75 parts styrene to 25 parts acrylonitrile.

In practicing the improved process of this invention, to styrene and acrylonitrile in a vessel equipped with a stirrer, there is added preferably finely ground monomer-soluble rubbery polymer in an amount of from 4 to 15 weight percent. To the solution of styrene, acrylonitrile and rubbery material there can also be added antioxidants, chain regulators, lubricants and inert filler. If desired, as an antioxidant, the conventional alkyl aryl phosphites can be used as well as the phenolic types, for example, trisnonylphenyl phosphite in amounts of from about 0.01 to 1.0 percent by weight or 2,6-ditertiary-butyl-4-methyl-phenol or mixtures of these. Mercaptans such as tertiary dodecyl mercaptan, can be added in amounts of from 0.01 to 0.3 weight percent for the purpose of controlling polymer chain length. Lubricants which can be incorporated in the solution are such as refined mineral oils, paraffin wax or mixtures with mineral oils and hydrocarbon oil or ester lubricants, such as butyl stearate in amounts of from 1 to 4 weight percent. A preferred mineral oil is one of a saturated aliphatic nature boiling at from 250° to 500° C. and of a centistoke viscosity (cps.) of from 5 to 100 at 100° F.

The acrylonitrile can be added to the styrene prior to the addition of rubber or after, the addition of this component not being critical at any specific step prior to the prepolymerization reaction.

After the addition of the acrylonitrile to the styrene, and the dissolution of the rubbery polymer, polymerization in bulk is commenced using at least an initiating amount of cyclohexnaone peroxide and polymerization is continued at a temperature which can range from 60° to 100° C., preferably from 75° to 90° C. The polymerization is continued until from 15 to 30 percent, in the preferred embodiment, of the monomers are polymerized in the mixture. The prepolymerization step generally takes from about 2 to 4 hours.

In accordance with this invention, the notched Izod impact values and the surface hardness of the finished resin can be improved by the use of the specific initiators of this invention in comparison to other initiators or initiator combinations heretofore known as will be illustrated in the examples to be presented below. Thus, when a fixed amount of rubber is used in graft polymerizations to obtain impact resistant interpolymers, it has been shown that the initiators described in this specification, and specifically cyclohexanone peroxide and t-butyl perbenzoate, when used in the two step bulk-suspension polymerization process consistently result in interpolymer products having higher impact and surface hardness values than when other well known initiators are used.

During the prepolymerization, the components of the system are thoroughly agitated. Agitation is required to properly disperse rubber as it comes out of solution during the prepolymerization step.

Upon completion of the prepolymerization step to the desired conversion, the mixture is suspended in an aqueous system containing stabilizers and the preferred initiators disclosed herein and polymerization continued to form beads of high impact material. It is preferable to add the cyclohexanone peroxide initiator to the prepolymerization step, followed by the addition of t-butyl perbenzoate to the suspension polymerization step. It is possible, however, to add both initiators to the prepolymerization step, in which case a proportion of the initiators is believed to carry over to the suspension step in an amount sufficient to give essentially complete polymerization. Suitable initiators which can be used during the suspension polymerization as heretofore indicated are t-butyl perbenzoate and those initiators having a similar half-life to t-butyl perbenzoate, such as dicumyl peroxide and tertiary-butyl peracetate. The suspension polymerization initiator shortens the overall polymerization time-temperature cycle. In accordance with this invention, the cyclohexanone peroxide can also be used in both the prepolymerizing and the polymerization steps, but it is preferred to use the combination of cyclohexanone peroxide in the prepolymerization step and the t-butyl perbenzoate in the suspension step.

The amount of suspension step initiator used is based on the weight of the prepolymer and the levels used are from about 0.05 to 0.3 percent by weight. From 0.1 to about 0.4 percent by weight can be used when a combination of the preferred initiators are employed for both polymerization steps (that is, added initially). Preferred levels are about 0.1 to 0.2 percent by weight for a single initiator added to each step of the process and 0.075 to 0.15 percent by weight for each of a combination when they are added initially to the prepolymerization reaction mixture.

The prepolymer, before or after the addition of the suspension step initiator, is suspended in an aqueous solution containing a suspending agent, and polymerization is continued at time-temperature cycles to be set forth hereinbelow until the monomer is substantially completely polymerized into substantially uniform sized granules or beads. Suspending agents such as carboxymethylcellulose, polyvinyl alcohol, methylcellulose, sulfonated polystyrenes, polyglycol ethers, etc., can be used.

A preferred suspending agent for use herein is a water-soluble non-ionic colloid of high viscosity in an aqueous solution. Hydroxyethyl cellulose is of particular interest since it yields optimum polymerization results. The use of this suspending agent results in non-agglomeration of the polymer beads, minimum water occlusion in the beads and beads having a narrow size distribution. Hydroxyethyl cellulose of a viscosity in a 1% aqueous solution at 25° C. of from 750 to 10,000 cps. (Brookfield viscometer) is adequate. A preferred viscosity range, however, for a 1% aqueous solution of hydroxyethyl cellulose is from 1500–3500 cps. (Brookfield viscometer) at 25° C.

In preparing the aqueous suspension, the hydroxyethyl cellulose is sifted into the water slowly and with rapid stirring to avoid the formation of agglomerates. If desired, a surface active agent such as sodium dodecylbenzenesulfonate can also be included in the suspension water in an amount of from 0.001 to 0.01 weight percent based on the water.

The amount of hydroxyethyl cellulose used is from about 0.025 to 1.5 weight percent and preferably in an amount of from 0.075 to 0.4 weight percent based on the water. Any dissolved oxygen or oxygen in the atmosphere immediately above the suspension is displaced by the use of nitrogen.

The prepolymer is added to the suspension, preferably in the vicinity of the agitator blade or vanes so as to facilitate the formation and dispersion of polymer beads. The prepolymer is added in an amount such that the ratio of prepolymer to water is generally from about 1:2 to 5:4, with best results being obtained with a prepolymer to water ratio of 1:1 to 3:4.

The temperature of the suspension is gradually increased from, for example, room temperature or higher, such as 80° C. up to about 135° C. and can, under suitable conditions, be increased up to 150° C., after which period non-agglomerated, uniform sized, high impact, thermoplastic polymer beads are formed in suspension. Excellent results are obtained when the suspension is maintained at a temperature of from 100° to 115° C. for 2 to 4 hours, then 115° to 125° C. for 1 to 2 hours and finally from 125° to 145° C. for 1 to 2 hours, especially when about 0.1 to 0.2% t-butyl perbenzoate is employed as the initiator.

The substantially completely polymerized beads prepared in accordance with the method herein described are separated from the suspension water by any of the conventional methods.

The following examples further illustrate the invention. The procedure employed in the examples was as follows.

Finely ground, monomer soluble, rubbery polymer was dissolved in a monomer blend of styrene and acrylonitrile. The solution was added to a round bottom flask equipped with a condenser and stirrer and while the solution was being agitated, cyclohexanone peroxide was added thereto and additives, such as chain transfer agents, antioxidants and lubricants. The flask and its contents were thoroughly flushed with nitrogen and a nitrogen blanket was maintained over the solution. The agitated solution was heated to and maintained at the reflux temperature of acrylonitrile until the monomer was partially polymerized, whereby a prepolymer was prepared. In cases where the prepolymerization temperature was above the boiling point of the monomer mixture, the polymerization was carried out under pressure.

An aqueous suspension bath was prepared by dissolving hydroxyethyl cellulose having a viscosity in a 1% aqueous solution at 25° C. from about 1500 to 2500 cps. (Brookfield viscometer) in a glass lined pressure reactor equipped with stirrer.

The prepolymer and t-butyl perbenzoate initiator were next added to the aqueous suspension bath. The reactor and its contents were flushed with nitrogen and the reactor was sealed and presurized with 5 to 20 p.s.i. nitrogen. Polymerization was continued with agitation at a temperature cycle of 3 hours at 115° C., 1 hour at 125° C and 1 hour at 135° C. Upon completion of the polymerization, the mixture was cooled, the reactor opened and the contents filtered to isolate the beads. The beads were washed with water and dried in a vacuum oven at 65° C. Physical properties were measured on compression-molded samples.

In the following examples, the weight of the rubbery component, mineral oil, trisnonylphenyl phosphite, t-dodecyl mercaptan and cyclohexanone peroxide was based upon 100 parts by weight of the prepolymerization mixture; the weight of the suspension step initiator (t-butyl perbenzoate unless otherwise indicated) was based upon 100 parts by weight of the prepolymer; and the weight of hydroxyethyl cellulose in the aqueous suspension bath was based upon the weight of the water.

*Example I*

This example illustrates that linear polybutadienes having a cis-1,4 content of about 35% can be used in accordance with the method described herein to prepare interpolymers having good physical properties with respect to heat deflection, surface hardness and impact resistance. Izod impact measurements were made according to A.S.T.M. Method D-256-56. The formulations employed and physical properties are set out in Table 1.

TABLE 1

| Ingredients | A | B | C [5] | D | E | F |
|---|---|---|---|---|---|---|
| Prepolymerization Step, parts by Weight: | | | | | | |
| Styrene | 75 | 75 | 75 | 75 | 75 | 75 |
| Acrylonitrile | 25 | 25 | 25 | 25 | 25 | 25 |
| Polybutadiene [1] | 8 | 8 | 8 | 8 | 8 | 8 |
| Cyclohexanone Peroxide | 0.2 | 0.2 | 0.2 | | | |
| Lauroyl Peroxide | | | | 0.1 | | |
| Azo-bis-isobutyronitrile | | | | | 0.1 | |
| Benzoyl Peroxide | | | | | | 0.1 |
| Trisnonylphenyl Phosphite | 0.5 | 0.5 | 0.5 | 0.5 | 0.5 | 0.5 |
| Mineral Oil | 3 | 3 | 3 | 3 | 3 | 3 |
| t-Dodecyl Mercaptan | 0.1 | 0.1 | 0.1 | 0.1 | 0.1 | 0.1 |
| Polymerization temp., °C | 80–90 | 80–90 | 80–90 | 80–90 | 75 | 80–90 |
| Total Solids, percent | 32 | 32 | 32 | 32 | 34 | 34 |
| Suspension Step, parts by weight: | | | | | | |
| Initiator Addition: | | | | | | |
| t-Butyl Perbenzoate | 0.2 | 0.2 | 0.075 | 0.2 | 0.2 | 0.2 |
| Benzoyl Peroxide | | | 0.15 | | | |
| Prepolymer | 100 | 100 | 100 | 100 | 100 | 100 |
| Water | 100 | 100 | 100 | 100 | 100 | 100 |
| Hydroxyethyl Cellulose | 0.30 | 0.25 | 0.25 | 0.28 | 0.3 | 0.28 |
| Physical Properties: | | | | | | |
| Izod Impact [2] (compression molded) | 4.25 | 4.0 | 2.8 | 3.3 | 1.6 | 2.9 |
| Melt Flow [3] at 190° C. (grams/10 minutes) | 0.8 | 0.1 | 0.1 | 0.1 | 0.1 | 0.1 |
| Hardness (Rockwell R) [4] | 100 | 100 | 100 | 57 | 79 | 78 |
| Heat Deflection Temp., °C. [6] (264 p.s.i.) | 92 | 92 | | | | |

[1] Linear polybutadiene having 35% cis-1,4 contest (Mooney viscosity=55).
[2] ASTM D-256-56.
[3] ASTM D-1238-57T (5,000 grams load).
[4] ASTM D-785-51.
[5] Time-temperature cycle in suspension step—3 hours at 90° C., 1 hour 115° C. and 1 hour at 130° C. A lower suspension polymerization temperature is required for benzoyl peroxide because of its faster decomposition rate.
[6] ASTM D-648-56.

In the above Table 1, it will be noted that: (a) Runs A and B wherein cyclohexanone peroxide and t-butyl perbenzoate are used as the initiators, that high impact values, surface hardness and heat deflection were obtained; (b) Run C wherein t-butyl perbonzoate was substantially replaced with benzoyl peroxide, resulted in drastic reduction of impact values even though other polymerization conditions remained substantially identical; (c) Runs E and F wherein initiators other than cyclohexanone peroxide were used in the prepolymerization, resulted in reduced impact and surface hardness. Smaller amounts of initiator were used in these prepolymerization runs because of their faster decomposition rates (these amounts are comparable to those disclosed in the prior art).

In Tables 2 and 3 below, the same rubber was used as in Table 1 and the same physical tests were performed on the interpolymer products.

Example II

In accordance with another important feature of this invention, the amount of cyclohexanone peroxide employed during polymerization was varied to effect changes in the physical properties. The polymerization process was the same as employed in Runs A and B of Example I and the physical testing methods are the same.

TABLE 2

| Ingredients | G | H | I | J |
|---|---|---|---|---|
| Prepolymerization Step: | | | | |
| Styrene/Acrylonitrile | 75/25 | 75/25 | 75/25 | 75/25 |
| Rubber | 8 | 8 | 8 | 8 |
| Mineral Oil | 3 | 3 | 3 | 3 |
| Trisnonylphenyl Phosphite | 0.5 | 0.5 | 0.5 | 0.5 |
| Cyclohexanone Peroxide | 0.1 | 0.15 | 0.2 | 0.25 |
| t-Dodecyl Mercaptan | 0.1 | 0.1 | 0.1 | 0.1 |
| Polymerization Temp., °C | 90 | 90 | 90 | 90 |
| Total Solids, Percent | 32 | 32 | 32 | 32 |
| Suspension Step: | | | | |
| Prepolymer | 100 | 100 | 100 | 100 |
| Water | 100 | 100 | 100 | 100 |
| Hydroxyethyl Cellulose | 0.3 | 0.3 | 0.3 | 0.3 |
| t-Butyl Perbenzoate | 0.2 | 0.2 | 0.2 | 0.2 |
| Physical Properties: | | | | |
| Izod Impact | 3.0 | 3.5 | 4.2 | 4.2 |
| Melt Flow (190° C.) | 0.1 | 0.1 | 0.1 | 0.1 |
| Hardness (Rockwell R) | 85 | 88 | 98 | 98 |

The above data shows that the Izod impact and the hardness values can be improved as desired depending upon the amount of cyclohexanone initiator utilized in the prepolymerization step and specifically when t-butyl perbenzoate is used as the suspension step initiator. Both values are improved with the use of larger amounts of cyclohexanone peroxide and then level off at an initiator concentration of about 0.2% by weight.

Example III

Various other runs are offered in Table 3 below to show the improvements described herein.

TABLE 3

| Ingredients | K | L | M |
|---|---|---|---|
| Prepolymerization Step: | | | |
| Styrene | 100 | 100 | ¹ 56 |
| Acrylonitrile | | | 44 |
| Rubber | 6 | 6 | 6 |
| Mineral Oil | 2 | 2 | 3 |
| Trisnonylphenyl Phosphite | 0.5 | 0.5 | 0.5 |
| Cyclohexanone Peroxide | 0.2 | | 0.2 |
| Benzoyl Peroxide | | 0.2 | |
| t-Dodecyl Mercaptan | 0.1 | 0.1 | 0.1 |
| Polymerization Temperature, °C | 80–90 | 80–90 | 80–90 |
| Total Solids, Percent | 29 | 31 | 30 |
| Suspension Step: | | | |
| Prepolymer | 100 | 100 | 100 |
| Water | 133 | 133 | 150 |
| Hydroxyethyl Cellulose | 0.28 | 0.3 | 0.35 |
| t-Butyl Perbenzoate | 0.2 | 0.2 | 0.2 |
| Physical Properties: | | | |
| Izod Impact | 1.6 | 1.1 | 3.6 |
| Melt Flow (190° C.) | 2.2 | 4.8 | 0.1 |
| Hardness (Rockwell R) | 100 | 100 | 104 |
| Heat Deflection, °C | | | 94 |

¹ Styrene added incrementally just before suspension to give an overall 70/30 ratio of monomers.

Table 3 above demonstrates: (a) that impact resistant polystyrene can be improved in the ultimate physical properties noted as shown in Run K (Izod impact) when employing the initiator(s) of this invention in comparison to Run L wherein benzoyl peroxide was substituted for cyclohexanone peroxide. Thus, while cyclohexanone peroxide has been shown to unexpectedly improve certain properties of the interpolymers herein, best results are obtained when a combination of cyclohexanone peroxide and t-butyl perbenzoate are used; (b) Run M illustrates an interpolymer wherein the overall ratio of styrene to acrylonitrile in the final product was 70/30. Note the excellent impact, surface hardness and heat deflection.

While particular embodiments of the invention are shown above, it will be understood that the invention is obviously subject to variations and modifications without departing from its broader aspects.

What is claimed is:

1. In a process for preparing an interpolymer which comprises the steps of prepolymerizing a reaction mixture comprising styrene and a rubbery polymer of a conjugated diolefin to from about 10 to 45% conversion, suspending the resulting reaction product mixture in an aqueous medium containing a suspension stabilizer, polymerizing to substantial completion, and recovering interpolymer beads from said suspension, the improvement which comprises employing cyclohexanone peroxide as a prepolymerization initiator and an initiator selected from the group consisting of t-butyl perbenzoate, dicumyl peroxide and t-butyl peracetate in the aqueous medium.

2. The process of claim 1 wherein the rubbery material is linear polybutadiene.

3. The process of claim 1 wherein the initiator is t-butyl perbenzoate.

4. The process of claim 1 wherein the amount of cyclohexanone peroxide employed is in the range of about 0.05 to 0.3 percent by weight based on the prepolymerization mixture.

5. The process of claim 1 wherein said prepolymerization step is carried out to a conversion of about 15 to 30%.

6. A process for preparing an interpolymer comprising acrylonitrile-styrene and a rubbery polymer of a conjugated diolefin in bead form which comprises the steps of (a) dissolving said rubbery polymer in a mixture of styrene and acrylonitrile, (b) prepolymerizing with agitation the resulting mixture in the presence of an initiating amount of cyclohexanone peroxide to a conversion of about 10 to 45%, (c) suspending the resulting prepolymerization reaction product mixture in an aqueous medium containing a suspension stabilizer and an initiator selected from the group consisting of t-butyl perbenzoate, dicumyl peroxide and t-butyl peracetate and (d) recovering interpolymer beads from said suspension.

7. The process of claim 6 wherein said rubbery polymer is linear polybutadiene having a cis-1,4 content of at least 30%.

8. The process of claim 6 wherein the amount of cyclohexanone peroxide employed is within the range of about 0.05 to 0.3% by weight.

9. The process of claim 6 wherein the initiator of step (c) is t-butyl perbenzoate.

10. The process of claim 6 wherein the suspension stabilizer is hydroxyethyl cellulose.

11. The process of claim 6 wherein alpha-methylstyrene is substituted in minor amounts for styrene.

12. The process of claim 6 wherein methyl methacrylate is also employed in the initial polymerization reaction.

(References on following page)

References Cited by the Examiner

UNITED STATES PATENTS 3,047,534   7/1962   Dyer et al. _____ 260—886 X

OTHER REFERENCES

Noller et al.: Effect of Accelerators and Inhibitors on Peroxide Curing of Polyesters, Modern Plastics, August 1962, pages 147, 150, 152, 154, 156 and 195, TP 986A1M6.

MURRAY TILLMAN, *Primary Examiner.*

G. F. LESMES, *Assistant Examiner.*